(12) United States Patent
Rahimzadeh et al.

(10) Patent No.: US 6,935,380 B2
(45) Date of Patent: Aug. 30, 2005

(54) REVERSIBLE DUAL SIZE PLUMBING END CAP

(75) Inventors: Rick Rahimzadeh, Woodland Hills, CA (US); John Hanna, Newbury Park, CA (US)

(73) Assignee: California Plumbing Products, Inc., Canoga Park, CA (US)

( * ) Notice: Subject to any disclaimer, the term of this patent is extended or adjusted under 35 U.S.C. 154(b) by 0 days.

(21) Appl. No.: 10/893,417

(22) Filed: Jul. 15, 2004

(65) Prior Publication Data

US 2005/0155659 A1   Jul. 21, 2005

Related U.S. Application Data

(60) Provisional application No. 60/537,715, filed on Jan. 20, 2004.

(51) Int. Cl.[7] ............................................... F16L 55/10
(52) U.S. Cl. ...................... 138/962; 138/89; 220/287; 215/319
(58) Field of Search ...................... 138/96 R, 96 T, 138/89; 220/287, 780; 215/319

(56) References Cited

U.S. PATENT DOCUMENTS

| | | | | |
|---|---|---|---|---|
| 2,168,734 A | * | 8/1939 | Freeman | 215/270 |
| 3,241,663 A | * | 3/1966 | Kaepernik | 206/63.3 |
| 3,724,223 A | * | 4/1973 | Pepe | 405/255 |
| D379,851 S | * | 6/1997 | Mathison | D23/260 |
| 6,408,887 B2 | * | 6/2002 | Rahimzadeh et al. | 138/96 R |
| 6,527,301 B1 | * | 3/2003 | Bathey | 285/45 |
| 6,568,430 B1 | | 5/2003 | Shafer | 138/96 R |

* cited by examiner

*Primary Examiner*—Patrick Brinson
(74) *Attorney, Agent, or Firm*—Kelly Lowry & Kelley, LLP

(57) ABSTRACT

A plumbing end cap for sealing an end of a selected pipe having either a first outer diameter or a second outer diameter includes a fluid impervious base for overlying the end of the selected pipe. The end cap also includes an endless wall fixed to a perimeter of the base and configured to seal the end of the selected pipe. The endless wall is pivotable between a first configuration to fit the first outer diameter and a second configuration to fit the second outer diameter.

23 Claims, 4 Drawing Sheets

REVERSIBLE DUAL SIZE PLUMBING END CAP

RELATED APPLICATION

This application claims the benefit of U.S. Provisional Application No. 60/537,715, filed on Jan. 20, 2004.

BACKGROUND OF THE INVENTION

The present invention relates generally to the permanent and temporary closure of threaded and plain end piping. More particularly, the present invention relates to a dual-size plumbing end cap.

Plumbing end caps are primarily designed for, but not limited to, temporarily and/or permanently closing the ends of all types of plumbing systems including, without limitation, waste piping, waste vents, storm drainage and irrigation pipe systems.

There are many instances in new construction, as well as in commercial and residential remodeling, when service technicians and homeowners desire to temporarily or permanently cap a pipe in order to make repairs, test newly installed piping, etc. For example, caps are used to pressurize systems for testing and inspection for installation and material defects. In another example, plumbing lines dedicated for future use are installed and capped until they are needed. During remodeling, plumbing lines that are being relocated need to be capped during while the new piping following the new route is being installed. Pipe ends are also capped when piping is to be permanently abandoned or in order to leave an accessible pipe end where a cap can be removed to allow for servicing and cleaning the piping system.

During the process of plumbing residential and commercial structures, a number of plumbing systems are installed. After each stage of piping installation, these systems must be tested and approved by the local building authorities. In order to accomplish this, the ends of all piping outlets are temporarily capped and sealed to allow pressure to be applied to this system, generally by the use of air or water, to expose possible installation and material defects. After successful completion of the tests, the systems are drained, the caps are removed and the next stage of installation is resumed. The process is repeated until the project is completed.

The above is only a limited sampling of the abundance of situations where plumbing caps are used; caps which necessarily come in an array of sizes and materials as there are a multitude of plumbing systems which require piping in a multitude of sizes and materials. For example, in small three bathroom residences, there are generally four common pipe sizes for waste and vent piping systems, 1½", 2", 3" and 4" diameters. Each pipe diameter is used according to the demand of the fixture it services. For example, a water closet drain will normally be serviced by a 3" or 4" pipe size. Lavatory and kitchen sink drains will normally be serviced by an 1½" or 2" pipe sizes. Additionally, building codes may require that each drain be provided with a separate vent pipe in order to allow the fixture drain to breathe. Each of these pipe ends must be capped and pressurized during the construction process. Depending on the jurisdiction, the piping materials used on these systems could include, without limitation, plain and threaded end cast iron pipe, copper tubing, steel pipe and a variety of plastic pipe.

In the above example of a three-bathroom residence, there would need to be a minimum of twenty caps of four varying pipe sizes to properly test the waste and vent systems whereas a multi-family residence, apartment building, condominium, hotel, medical facility or high rise structure would use thousands of caps per project to complete a required plumbing test. Furthermore, larger structures have an increased demand which increases the size of the overall piping system. These larger piping system sizes can range from a 1½" outside diameter to a 16" outside diameter and larger.

Currently the most popular method of capping these systems is by way of a single diameter pipe cap. The most common type of pipe cap used for this type of capping is made of an elastomeric material including, but not limited to, rubber, synthetic rubber, silicone or a plastic material. The cap is manufactured to form to the contour of the pipe end and is fastened to the pipe end by the use of a stainless steel work drive clamp. These caps, at one time referred to under the name Jim Caps, are reusable and used daily by plumbing professionals, builders, service persons and home owners. They are inventoried at all plumbing wholesalers, home centers and hardware establishments. However, each of these caps only accommodates a single size of pipe.

Accordingly, there is a need for an end cap that can accommodate more than one pipe size. There is a further need for an end cap that accommodates a particular pipe size in a first configuration and then accommodates another pipe size in a second configuration. There is also a need for an end cap that accommodates a first pipe size as well as a second pipe size either one size larger than or one size smaller than the first pipe size. The present invention satisfies these needs and provides other related advantages.

SUMMARY OF THE INVENTION

This present invention provides a single end cap capable of capping a single pipe end of a certain diameter while also having the capacity to also accommodate a different pipe diameter. The present invention discloses a cap capable of being used to close off a threaded, grooved or plain end cylindrical member, such as a pipe. A cap embodying the present invention can be permanently installed or be removable for reuse at a later time; In particular, the present invention can be used as either a temporary or a permanent end cap to terminate pipe ends.

In accordance with an embodiment of the present invention, a plumbing end cap is disclosed for sealing an end of a selected pipe having either a first outer diameter or a second outer diameter. The end cap includes a fluid impervious base for overlying the end of the selected pipe. The end cap further includes an endless wall fixed to a perimeter of the base and configured to seal the end of the selected pipe. The endless wall is pivotable between a first configuration to fit the first outer diameter and a second configuration to fit the second outer diameter.

The endless wall, in the first configuration, envelops the first outer diameter and, in the second configuration, is inverted to envelop the second outer diameter. A surface of the wall engaging the selected pipe may include a band for forming a fluid impervious seal between the wall and the selected pipe. The endless wall typically comprises a resiliently flexible material. The endless wall automatically reverts to the first configuration when removed from a selected pipe of the second outer diameter.

Preferably, the base and the wall are of unitary construction and the wall is generally cylindrical in shape. The base includes an annular lip for abutting the wall in the second configuration. The wall is adjacent to the annular lip in the second configuration. A clamp may be used to surround the wall and provide additional force to hold the wall to the pipe.

Further, test fitting may extend through the base. The test fitting is configured for securely connecting a test gauge, air source or water source thereto.

A cap embodying the present invention is a one piece, generally cylindrical, impervious, self-supporting body which seals pipe ends of two different pipe diameters. The clamp used in conjunction with the cap embodying the present invention increases and decrease in size, enabling the clamp to fasten the cap over both pipe diameters for which the cap is sized. The flexibility and design of the walls of the cap allow the cap to be inverted, while maintaining its strength and integrity. By inverting the cap embodying the present invention, the piping system can be filled or drained from two different diameters pipe ends for which that particular cap was designed.

The plumbing end cap simplifies and reduces the overall amount of caps necessary to be inventoried. Plumbing suppliers, wholesales, home centers and hardware stores can cut inventories and save on the use of valuable shelf space. For example, a home center could stock a 1½"×2" cap, and a 3"×4" cap, thus reducing their inventory by 50% and still providing the same product availability. Furthermore, a cap capable of fitting more than one pipe takes the guesswork out of choosing the proper size and amount of caps necessary to complete a project (especially in the case of a homeowner who is not familiar with common pipe size diameters).

If piping has not yet been exposed and a specific pipe size determined, such as a sewer line below grade or piping beneath a structure or home, a service technician would be better equipped to handle the job by having an end cap capable of fitting more than a single pipe diameter as this saves the technician from making an extra trip to a plumbing supplier or home center because he or she was not equipped with the proper size cap. Contractors need not determine exact quantities of each cap needed to test a small or large project as ordering two cap variations allows the contractor to be equipped to cap four pipe sizes. The convenience and cost savings are immeasurable as this results in reducing the waste of the raw materials used to manufacture the end caps since few caps need to be made; reducing the waste of raw materials also keeps the end user's costs down.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
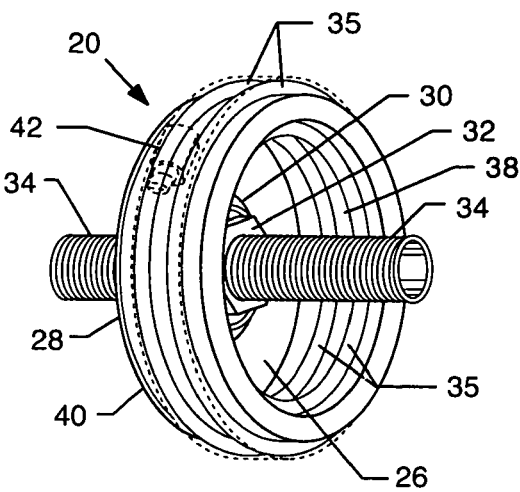
FIG. 1 is an orthogonal view of an end cap embodying the present invention with male and female fittings.

As shown in the drawings for purposes of illustration, the present invention resides in improved dual size plumbing end caps that are reversible to accommodate pipes of two distinctively different diameters. The plumbing end caps embodying this invention are referred to by the reference number 20 in FIGS. 1–5, by the reference number 50 in FIGS. 6–7, by the reference number 60 in FIGS. 8–9, by the reference number 80 in FIGS. 10–11, and by the reference number 90 in FIGS. 12–15. While each illustrated embodiment differs from the others in features and construction, they are all functionally equivalent. Each end cap 20, 50, 60, 80, 90 can be moved between a first configuration where the cap 20, 50, 60, 80, 90 fits over a first pipe of certain outer diameter and a second configuration where the cap 20, 50, 60, 80, 90 is removed from the first pipe, inverted and then fit over a second pipe have a different outer diameter than the first pipe. The outer diameter of the second pipe can be larger or smaller than the outer diameter of the first pipe, depending on which cap 20, 50, 60, 80, 90 is used. The end cap 20, 50; 60, 80, 90 is designed to be inverted such that the cap 20, 50, 60, 80, 90 is able to fit as easily over the second pipe as it fits over the first pipe.

Figure 2:
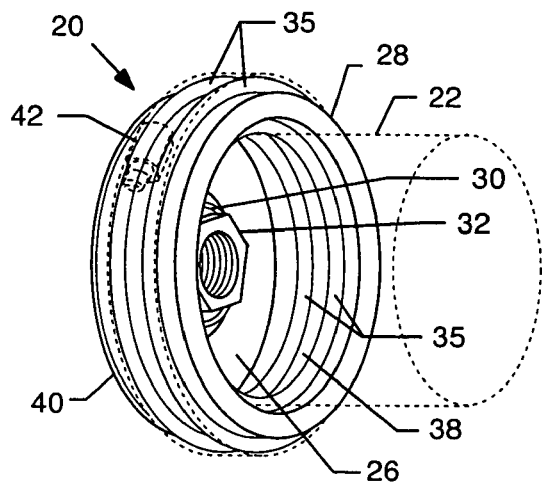
FIG. 2 is an orthogonal view of the end cap of FIG. 1 shown without the male fitting and a pipe end (shown in phantom)

FIGS. 1 and 2 illustrate the plumbing end cap 20 in the first configuration which is the natural state of the cap 20. The cap 20 is capable of sealing an end of a selected pipe 22, 24 having, respectively, either a first outer diameter or a second outer diameter. The end cap 20 includes a fluid impervious base 26 for overlying the end of the selected pipe 22, 24. The end cap 20 further includes an endless wall 28 fixed to a perimeter of the base 26 and configured to seal the end of the selected pipe 22, 24.

The end cap 20 is inverted by pivoting the endless wall 28 between the first configuration where the cap 20 envelops the end of the pipe 22 with the first outer diameter and the second configuration (FIG. 3) where the cap 20 envelops the end of pipe 24 with the second outer diameter. The cap 20 is inverted from the first configuration to the second configuration by pivoting the end of the wall 28 opposite the base 26 outward and then pulling that end of the wall 28 towards the base 26 and into the second configuration. The flexibility and taper of the wall 28 allows the cap 20 to be inverted, while maintaining its strength and integrity. The same flexibility is found in all the caps 20, 50, 60, 80, 90.

The base 26 and endless wall 28 of the cap 20 of FIGS. 1–5 are comprised of a resiliently flexible material able to withstand pressures commonly used in the engineering of domestic and commercial plumbing systems including, but not limited to elastomeric material, such as rubber, synthetic rubber, plastics, vinyl and silicone. The flexibility of the endless wall 28 allows the wall 28 to automatically revert to the first configuration from the second configuration when the cap 20 is removed from a selected pipe of the second outer diameter. The base 26 and the wall 28 are of unitary construction, and the wall 28 is generally cylindrical in shape.

The base 26 also includes a tubular metallic or plastic reinforcement 30 in the center of the base 26 to allow the attachment of a female pipe threaded fitting 32 and/or a male pipe thread fitting 34 through a passageway 36 in the base 26 which would allow filling and draining of a particular piping system for the purpose of testing. The reinforcement 30 is be locked and sealed in the center of the base 26. The reinforcement 30 allows a user to attach a device, such as an air test filler gauge, hose bib, valve or similar device, from either side of the base 26 of the reversible dual end cap 20. When the test device is not needed a threaded or variety of push-on type caps (not shown) could be attached to plug the passageway 36. One side of the base 26 faces the pipe 22 in the first configuration while the opposite side of the base 26 faces the pipe 24 in the second configuration.

The test fittings 32, 34 extend through the base 26 and serve the purpose of filling and draining a piping system when the cap 20 is secured to a section of pipe 22, 24 within that system. The fittings 32, 34 are configured for securely connecting a test gauge, air source or water source thereto. These fittings 32, 34 are permanently attached to create air and water tight seals to the cap 20 by means of locknuts, washers and grommets, or by the bonding of rubber and metallic materials to affix the fittings 32, 34 to the cap 20 (allowing air and water tight seals between even dissimilar materials). A female threaded valve body, hose-bib, air test gauge or similar device commonly used in testing plumbing systems (not shown) can be attached to the male end threaded pipe 34 and a male threaded valve body, hose-bib, air test gauge or similar device commonly used in testing plumbing systems (not shown) can be attached to the female fitting 32. The fittings previously described are not limited to, but are only an example of one type of fitting to a valve type assembly. Other possible types of fittings to valve assemblies can be push-pull fittings, quick-disconnect fittings, compression fittings, twist lock fittings or the like.

A surface of the wall 28 engaging the selected pipe 22, 24 includes a band 35 for forming a fluid impervious seal between the wall 28 and the selected pipe 22, 24. The band 35 comprises raised o-ring beads or knurls on the surfaces 38, 40 of the wall 28 of the cap 20 and are used to assist in a positive seal when tension is applied to a clamp 42 surrounding the wall 28 to provide additional force to hold the wall 28 to the pipe and, by extension, the band 30 contacting the surface of the pipe providing a positive seal. The bands 35 on the surfaces 38, 40 of the wall 28 are shown opposite each other but may be positioned offset from one another or the like. The clamp 42 may be made from a variety of materials including, but not limited to, plastic, stainless steel or the like and comes in various forms including, but not limited to, a worm drive clamp. The clamp 42 is designed to increase and decrease in size enabling the clamp 42 to fasten the cap 20 to both pipe diameters 22, 24.

For the purpose of clarity, the surfaces of the wall 28 will be referred to as the first and second surfaces 38, 40 as the term 'interior surface', with respect to the surfaces 38, 40 of the wall 28, is relative to the particular configuration the cap 20 is in. The first surface 38 of the wall 28 can be the interior surface of the wall 28 in the first configuration but the exterior surface of the wall 28 when the wall 28 is inverted to the second configuration. Likewise, The second surface 40 of the wall 28 can be the exterior surface of the wall 28 in the first configuration but the interior surface of the wall 28 when the wall 28 is inverted to the second configuration. The clamp 42 is always placed on the exterior surface of the wall 28 and the band 30 on the interior surface of the wall 28 contacts the pipe to provide a seal.

Figure 3:
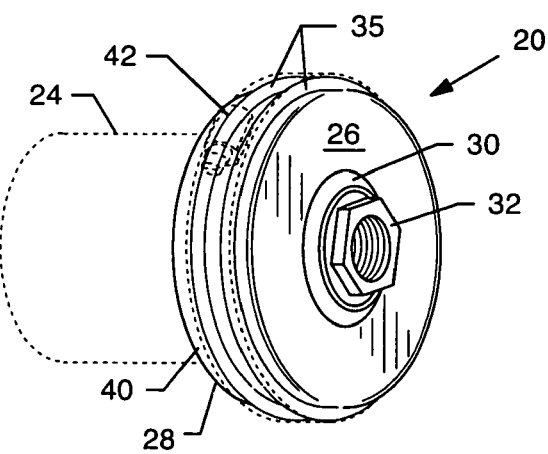
FIG. 3 is an orthogonal view of the end cap of FIG. 1 inverted on a second pipe end of a different diameter (shown in phantom)
Figure 4:
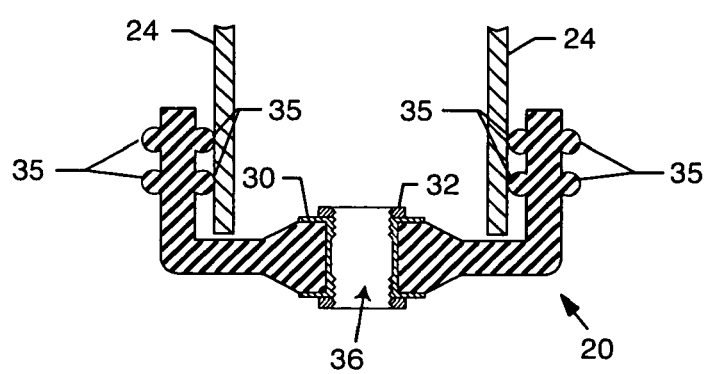
FIG. 4 is a cross-sectional view of the end cap and pipe of FIG. 2.
Figure 5:
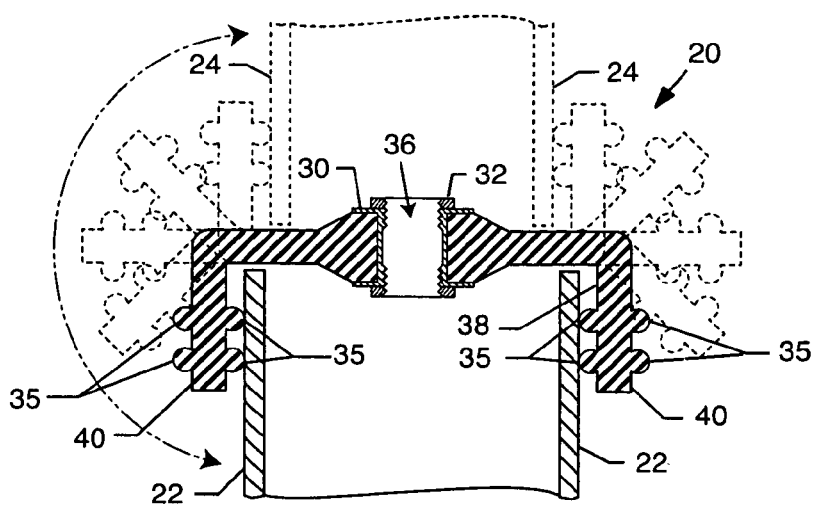
FIG. 5 is a cross-sectional view of the end cap of FIGS. 1 and 2 being inverted from the configuration of the cap in FIG. 1 to the configuration of the cap in FIG. 2.

FIGS. 1–5 illustrate section of pipe 22 being capped in the first configuration which has a larger outer diameter then the pipe 24 being capped in the second configuration. The bead or knurls of the band 30 assist the cap 20 in creating an air and water tight seal when tension is applied by tightening the worm drive clamp 42, thus forcing the beads and/or knurls of the band 30 and the interior surface of the cap wall 28 to the outside diameter of the pipe 22, creating an air and water tight seal. The exterior surface of the wall 28 in the first configuration is intended for use in capping the smaller diameter pipe in the second configuration and is also shown with o-ring beads and/or knurls of the band 30 to assist in a positive seal on the smaller pipe section when the cap 20 is inverted to the second configuration, as seen in FIG. 3, when the cap 20 is secured on a smaller pipe diameter, and no longer in its natural state. The same worm drive clamp 42 is used for securing the cap 20 to either pipe 22, 24. The clamp 42 is not shown in FIGS. 4 and 5 for purposes of clarity. The phantom lines of the wall 28 of the cap 20 illustrate the inverting motion that occurs when the wall 28 is moving the between the first and second configurations.

Figure 6:
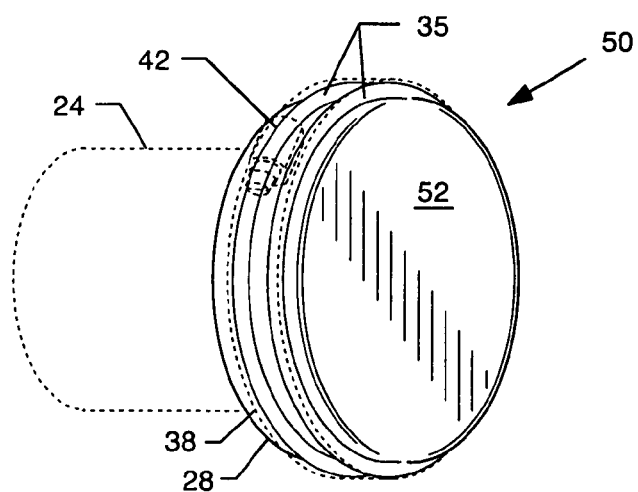
FIG. 6 is an orthogonal view of another end cap embodying the present invention.
Figure 7:
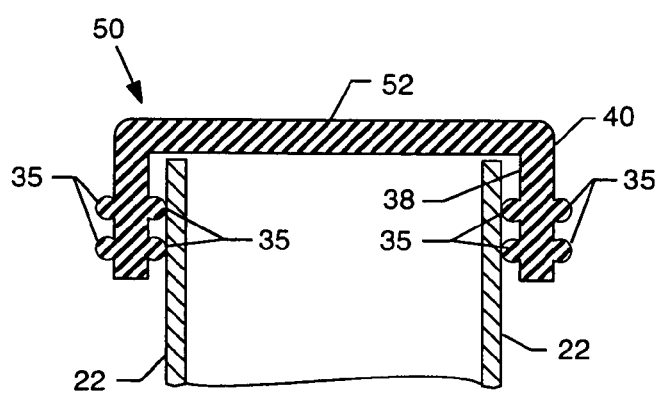
FIG. 7 is a cross-sectional view of the end cap of FIG. 6.

FIGS. 6 and 7 illustrate an end cap 50 nearly identical in form and function to the end cap 20 described above, except that there is no passageway 36 for the reinforcement 30 and/or female or male fittings 32, 34. Instead, the cap 50 includes a solid base 52.

Figure 8:
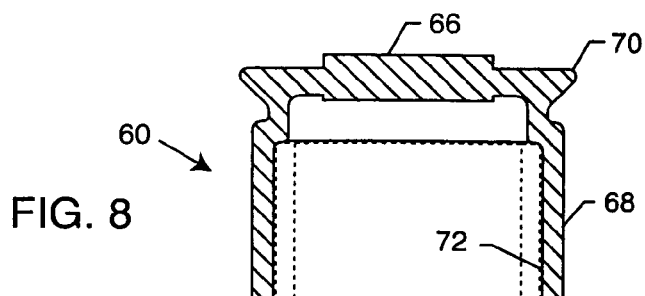
FIG. 8 is a cross-sectional view of another end cap embodying the present invention with an annular lip around a base of the cap.
Figure 9:
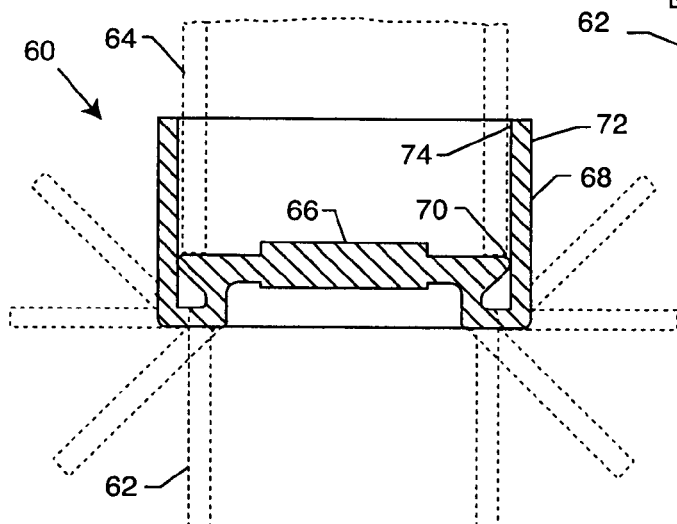
FIG. 9 is a cross-sectional view of the end cap of FIG. 8 being inverted from the configuration of the cap in FIG. 8 to another configuration to fit a larger diameter pipe than the pipe shown in FIG. 8.

In FIGS. 8 and 9, an end cap 60 is shown in a first configuration (FIG. 8) that is the natural state of the cap 60. The cap 60 seals an end of a selected pipe 62, 64 having, respectively, either a first outer diameter or a second outer diameter. The end cap 60 includes a fluid impervious base 66 for overlying the end of the selected pipe 62, 64. The end cap 60 further includes an endless wall 68 fixed to a perimeter of the base 66 and configured to seal the end of the selected pipe 62, 64.

The end cap 66 is inverted by pivoting the endless wall 68 between a first configuration where the cap 60 envelops the end of the pipe 62 with the first outer diameter and a second configuration (FIG. 9) where the cap 60 envelops the end of the pipe 64 with the second outer diameter. The flexibility and taper of the wall 68 allows the cap 60 to be inverted, while maintaining its strength and integrity. The cap 60 is inverted from the first configuration to the second configuration by pivoting the end of the wall 68 opposite the base 66 outward and then pulling that end of the wall 68 towards the base 66 and into the second configuration.

An annular lip 70 surrounds the perimeter of the base 66. The annular lip 70 is adjacent to and abuts the wall 68 in the second configuration. In this embodiment, the outer diameter of the first pipe 62 is smaller than the outer diameter of the second pipe 64.

The base 66 and endless wall 68 of the cap 60 of FIGS. 8 and 9 are comprised of a resiliently flexible material able to withstand pressures commonly used in the engineering of domestic and commercial plumbing systems including, but not limited to elastomeric material, such as rubber, synthetic rubber, plastics, vinyl and silicone. The flexibility of the endless wall 68 allows the wall 68 to automatically revert to the first configuration from the second configuration when the cap 60 is removed from a selected pipe of the second outer diameter. The base 66 and the wall 68 are of unitary construction, and the wall 68 is generally cylindrical in shape.

For the purpose of clarity, the surfaces of the wall 68 will be referred to, respectively, as the first and second surfaces 72, 74 as the term 'interior surface', with respect to the surfaces 72, 74 of the wall 68, is relative to the particular configuration the cap 60 is in. The first surface 72 of the wall 68 can be the interior surface of the wall 68 in the first configuration but the exterior surface of the wall 68 when the wall 68 is inverted to the second configuration. Likewise, the second surface 74 of the wall 68 can be the exterior surface of the wall 68 in the first configuration but the interior surface of the wall 68 when the wall 68 is inverted to the second configuration. A clamp (not shown) may surround the wall 68 to provide additional force to hold the wall 68 to the pipe 62, 64. The clamp comes in various forms including, but not limited to, a worm drive clamp.

Figure 10:
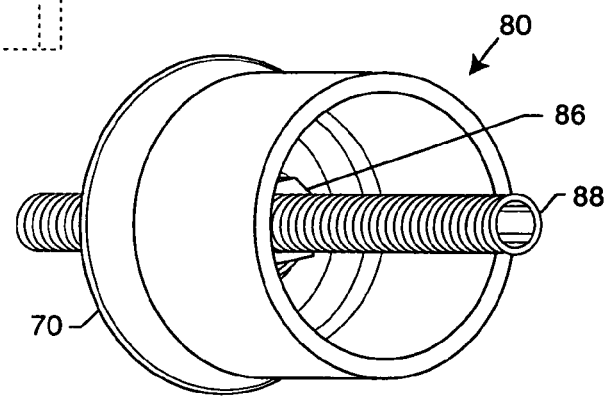
FIG. 10 is an orthogonal view of an end cap embodying the present invention, similar to the end cap of FIG. 8 but with male and female fittings.
Figure 11:
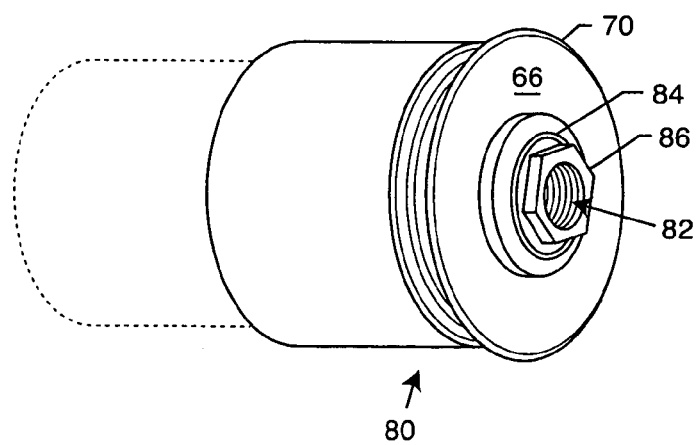
FIG. 11 is an orthogonal view of the opposite side of the end cap of FIG. 10.
Figure 12:
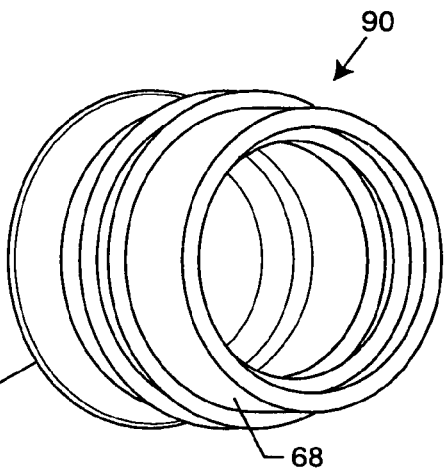
FIG. 12 is an orthogonal view of yet another end cap embodying the present invention.
Figure 13:
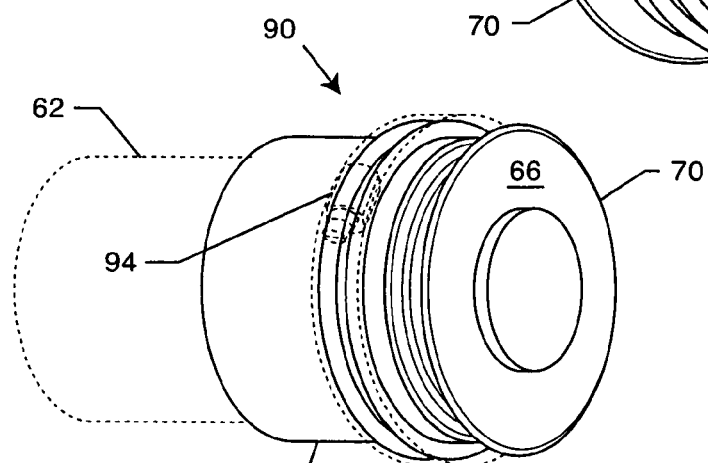
FIG. 13 is an orthogonal view of the opposite side of the end cap of FIG. 12.
Figure 14:
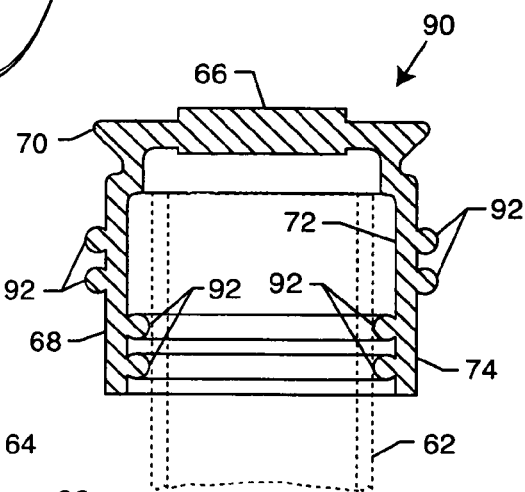
FIG. 14 is a cross-sectional view of the end cap of FIG. 12.
Figure 15:
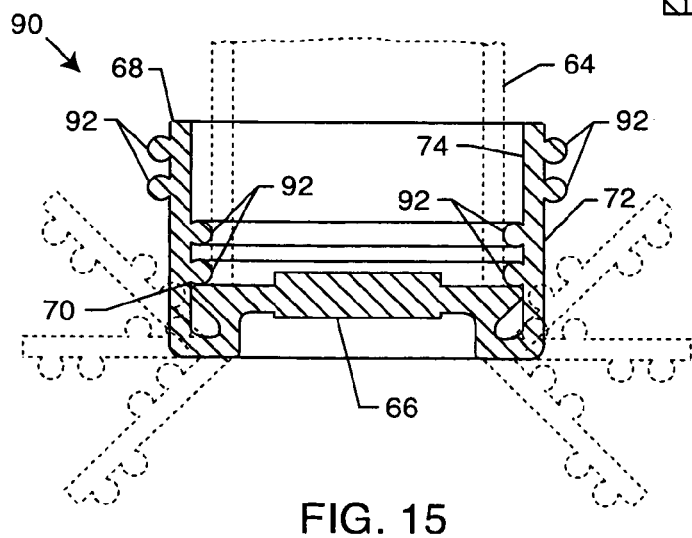
FIG. 15 is a cross-sectional view of the end cap of FIG. 14 being inverted from the configuration of the cap in FIG. 14 to another configuration to fit a larger diameter pipe than the pipe shown in FIG. 14.

FIGS. 10 and 11 illustrate an end cap 80 nearly identical in form and function to the end cap 60 described above, except that there is a passageway 82 (similar to passageway 36 in FIGS. 1–5) for a reinforcement 84 (similar to the reinforcement 30 in FIGS. 1–5) as well as female and/or male fittings 86, 88 (similar to the fittings 32, 34 in FIGS. 1–5). The plastic reinforcement 84 allows the attachment of the female pipe threaded fitting 86 and/or a male pipe thread fitting 88 through the passageway 82. As stated above, the purpose of the fittings 86, 88 is to fill and drain a piping system when the cap 80 is secured to a section of pipe within that system and are configured for securely connecting a test gauge, air source or water source thereto. These fittings 86, 88 are permanently attached to create air and water tight seals to the cap 80 by means of locknuts, washers and grommets, or by the bonding of rubber and metallic materials to affix the fittings 86, 88 to the cap 80. A female threaded valve body, hose-bib, air test gauge or similar device (not shown) can be attached to the male end threaded pipe 88.

FIGS. 12–15 illustrate an end cap 90 nearly identical in form and function to the end cap 60 described above, except that this end cap 90 includes a band 92 (similar to the band 35 of FIGS. 1–5) for forming a fluid impervious seal where the surfaces 72, 74 of the wall 68 engage the selected pipe 62, 64. The band 92 comprises raised o-ring beads or knurls on the surfaces 72, 74 of the wall 68 and are used to assist in a positive seal when tension is applied to a clamp 94 surrounding the wall 68 to provide additional force to hold the wall 68 to the pipe and, by extension, the band 92 contacting the surface of the pipe providing a positive seal. The clamp 94 may be made from a variety of materials including, but not limited to, plastic, stainless steel or the like and comes in various forms including, but not limited to, a worm drive clamp. The clamp 94 is designed to increase and decrease in size enabling the clamp 94 to fasten the cap 90 to both pipe diameters 22, 24. In this end cap 90, the bands 92 on the surfaces 72, 74 are offset from one another.

FIGS. 1–7 and 12–15 show examples of the bands 35, 92 of o-ring beads and/or knurls but the bands 35, 92 are not necessary to the function of the two diameter inverting caps 20, 50, 90. The beads 35, 92 are a design enhancement used to increase friction cohesion between the caps 20, 50, 90 and the pipes 22, 24. The caps 20, 50, 60, 80 90 illustrated in the drawings are designed and engineered to drop one or more commonly used pipe size using a combination of the o-ring beads, knurls, tapers and varying wall thicknesses.

While the caps 20, 50, 60, 80, 90 will predominately be used in the plumbing, irrigation and municipal pipeline industries, the caps 20, 50, 60, 80, 90 may also be used in industries not yet realized.

The plumbing end caps 20, 50, 60, 80, 90 of the present invention are designed to improve on conventional end caps by utilizing a single cap to handle a pipe of a certain size, and then inverting the end cap to accommodate either a smaller pipe size or a larger pipe size (thus making it a two-diameter cap). When the cap 20, 50, 60, 80, 90 is attached to first pipe in the first configuration, the cap 20, 50, 60, 80, 90 is inverted by removing the clamp 42, 94, pressing the center of the base 26, 66 of the 20, 50, 60, 80, 90 cap, pulling the walls 28, 68 outwardly and then peeling back the walls 28, 68 until the walls 28, 68 pass the base 26, 66 and can move no further. As the wall 28, 68 is peeled back, the cap 20, 50, 60, 80, 90 comes off the pipe. When the cap 20, 50, 60, 80, 90 is freed from the first pipe, it is then placed over a second pipe and the clamp 42, 94 placed over the cap 20, 50, 60, 80, 90. By engineering the wall thickness and contour of the base 26, 66, the inverted cap's interior diameter would be one or more pipe sizes different than its original state.

Although an embodiment has been described in detail for purposes of illustration, various modifications may be made without departing from the scope and spirit of the invention.

What is claimed is:

1. A plumbing end cap for sealing an end of a first pipe having a first outer diameter or a second pipe having a second outer diameter, comprising:
    a fluid impervious base for overlying the end of the selected pipe; and
    an endless wall fixed to a perimeter of the base and configured to seal the end of the first or second pipe, the endless wall being pivotable between a first configuration to fit the first outer diameter of the first pipe and a second configuration to fit the second outer diameter of the second pipe.

2. The plumbing end cap of claim 1, wherein the endless wall, in the first configuration, envelops the first outer diameter and, in the second configuration, is inverted to envelop the second outer diameter.

3. The plumbing end cap of claim 1, wherein a surface of the wall engaging the selected pipe includes a band for forming a fluid impervious seal between the wall and the selected pipe.

4. A plumbing end cap for sealing an end of a selected pipe having either a first outer diameter or a second outer diameter, comprising:
    a fluid impervious base for overlying the end of the selected pipe;
    an endless wall fixed to a perimeter of the base and configured to seal the end of the selected pipe, the endless wall being pivotable between a first configuration to fit the first outer diameter and a second configuration to fit the second outer diameter; and
    a test fitting extending through the base.

5. The plumbing end cap of claim 4, wherein the test fitting is configured for securely connecting a test gauge, air source or water source thereto.

6. A plumbing end cap for sealing an end of a selected pipe having either a first outer diameter or a second outer diameter, comprising:
   a fluid impervious base for overlying the end of the selected pipe;
   an endless wall fixed to a perimeter of the base and configured to seal the end of the selected pipe, the endless wall being pivotable between a first configuration to fit the first outer diameter and a second configuration to fit the second outer diameter; and
   wherein the endless wall comprises a resiliently flexible material;
   wherein the endless wall automatically reverts to the first configuration when removed from a selected pipe of the second outer diameter.

7. The plumbing end cap of claim 1, including a clamp surrounding the wall.

8. The plumbing end cap of claim 1, wherein the base and the wall are of unitary construction, and the wall is generally cylindrical in shape.

9. A plumbing end cap for sealing an end of a selected pipe having either a first outer diameter or a second outer diameter, comprising:
   a fluid impervious base for overlying the end of the selected pipe; and
   an endless wall fixed to a perimeter of the base and configured to seal the end of the selected pipe, the endless wall being pivotable between a first configuration to fit the first outer diameter and a second configuration to fit the second outer diameter;
   wherein the base includes an annular lip for abutting the wall in the second configuration.

10. The plumbing end cap of claim 9, wherein the wall is adjacent to the annular lip in the second configuration.

11. A plumbing end cap for sealing an end of a selected pipe having either a first outer diameter or a second outer diameter, comprising:
    a fluid impervious base for overlying the end of the selected pipe, the base including an annular lip; and
    a generally cylindrical resiliently flexible endless wall fixed to a perimeter of the base and configured to seal the end of the selected pipe, the endless wall being pivotable between a first configuration to fit the first outer diameter and a second configuration to fit the second outer diameter, the wall being adjacent to the annular lip in the second configuration;
    wherein the base and the wall are of unitary construction, and wherein the endless wall, in the first configuration, envelops the first outer diameter and, in the second configuration, is inverted to envelop the second outer diameter, the endless wall automatically reverting to the first configuration when removed from a selected pipe of the second outer diameter.

12. The plumbing end cap of claim 4, wherein the endless wall, in the first configuration, envelops the first outer diameter and, in the second configuration, is inverted to envelop the second outer diameter.

13. The plumbing end cap of claim 4, wherein a surface of the wall engaging the selected pipe includes a band for forming a fluid impervious seal between the wall and the selected pipe.

14. The plumbing end cap of claim 4, including a clamp surrounding the wall.

15. The plumbing end cap of claim 4, wherein the base and the wall are of unitary construction, and the wall is generally cylindrical in shape.

16. The plumbing end cap of claim 6, wherein the endless wall, in the first configuration, envelops the first outer diameter and, in the second configuration, is inverted to envelop the second outer diameter.

17. The plumbing end cap of claim 6, wherein a surface of the wall engaging the selected pipe includes a band for forming a fluid impervious seal between the wall and the selected pipe.

18. The plumbing end cap of claim 6, including a clamp surrounding the wall.

19. The plumbing end cap of claim 6, wherein the base and the wall are of unitary construction, and the wall is generally cylindrical in shape.

20. The plumbing end cap of claim 9, wherein the endless wall, in the first configuration, envelops the first outer diameter and, in the second configuration, is inverted to envelop the second outer diameter.

21. The plumbing end cap of claim 9, wherein a surface of the wall engaging the selected pipe includes a band for forming a fluid impervious seal between the wall and the selected pipe.

22. The plumbing end cap of claim 9, including a clamp surrounding the wall.

23. The plumbing end cap of claim 9, wherein the base and the wall are of unitary construction, and the wall is generally cylindrical in shape.

* * * * *